United States Patent
Parry

(10) Patent No.: US 9,844,996 B2
(45) Date of Patent: Dec. 19, 2017

(54) MOBILE THERMAL REGULATION FACILITY

(71) Applicant: Steven Edward Parry, Jacksonville, FL (US)

(72) Inventor: Steven Edward Parry, Jacksonville, FL (US)

(*) Notice: Subject to any disclaimer, the term of this patent is extended or adjusted under 35 U.S.C. 154(b) by 142 days.

(21) Appl. No.: 14/745,430

(22) Filed: Jun. 20, 2015

(65) Prior Publication Data

US 2016/0207372 A1  Jul. 21, 2016

Related U.S. Application Data

(60) Provisional application No. 62/105,234, filed on Jan. 20, 2015.

(51) Int. Cl.
*B60H 1/00* (2006.01)
*B60P 3/32* (2006.01)

(52) U.S. Cl.
CPC ..... *B60H 1/00364* (2013.01); *B60H 1/00828* (2013.01); *B60P 3/32* (2013.01)

(58) Field of Classification Search
CPC ............ B60H 1/00364; B60H 1/00828; B60H 1/00014; B60P 3/32; B60P 3/20; B60P 3/14; F24F 2011/0005; F24F 2011/0036; F24F 11/008
See application file for complete search history.

(56) References Cited

U.S. PATENT DOCUMENTS

| | | | | |
|---|---|---|---|---|
| 4,157,201 A * | 6/1979 | Collins | ................... | B60P 3/423 296/156 |
| 5,531,641 A * | 7/1996 | Aldrich | .................. | B60H 1/247 454/100 |
| 5,697,223 A * | 12/1997 | Ishii | .................... | B60H 1/00785 165/231 |
| 6,302,475 B1 * | 10/2001 | Anderson | ................. | B60P 3/34 296/175 |
| 2006/0103154 A1 * | 5/2006 | Berry | ........................ | B60P 3/32 296/24.39 |
| 2007/0132262 A1 * | 6/2007 | Chui Peng Sun | ..... | A61G 3/001 296/24.38 |
| 2008/0104971 A1 * | 5/2008 | Sami | .................. | B60H 1/00364 62/78 |
| 2008/0314072 A1 * | 12/2008 | Plank | ................. | B60H 1/00364 62/498 |
| 2009/0001742 A1 * | 1/2009 | Chui | ........................ | B60P 3/14 296/24.38 |
| 2012/0031686 A1 * | 2/2012 | Ferrigni | ................ | B60P 3/0257 180/2.2 |

(Continued)

*Primary Examiner* — Grant Moubry
*Assistant Examiner* — Schyler S Sanks
(74) *Attorney, Agent, or Firm* — Mark Young, P.A.

(57) ABSTRACT

A mobile thermal regulation facility is a trailer mounted container defining a thermally regulated interior space in which people may walk, stand and sit. One or more doors are provided for ingress and egress. An exhaust fan may maintain a negative pressure space between paired doors to help maximize energy efficiency. Seating is provided. Electric and data utilities in the form of one or more outlets, USB charging stations, an internet access points (e.g., WiFi) may also be provided. Other accoutrements may include display screens for displaying television programming or video captured events.

13 Claims, 5 Drawing Sheets

(56) References Cited

U.S. PATENT DOCUMENTS

2014/0161673 A1* 6/2014 Hammer ................. A61L 9/012
   422/124
2014/0262132 A1* 9/2014 Connell ............. B60H 1/00457
   165/11.1

* cited by examiner

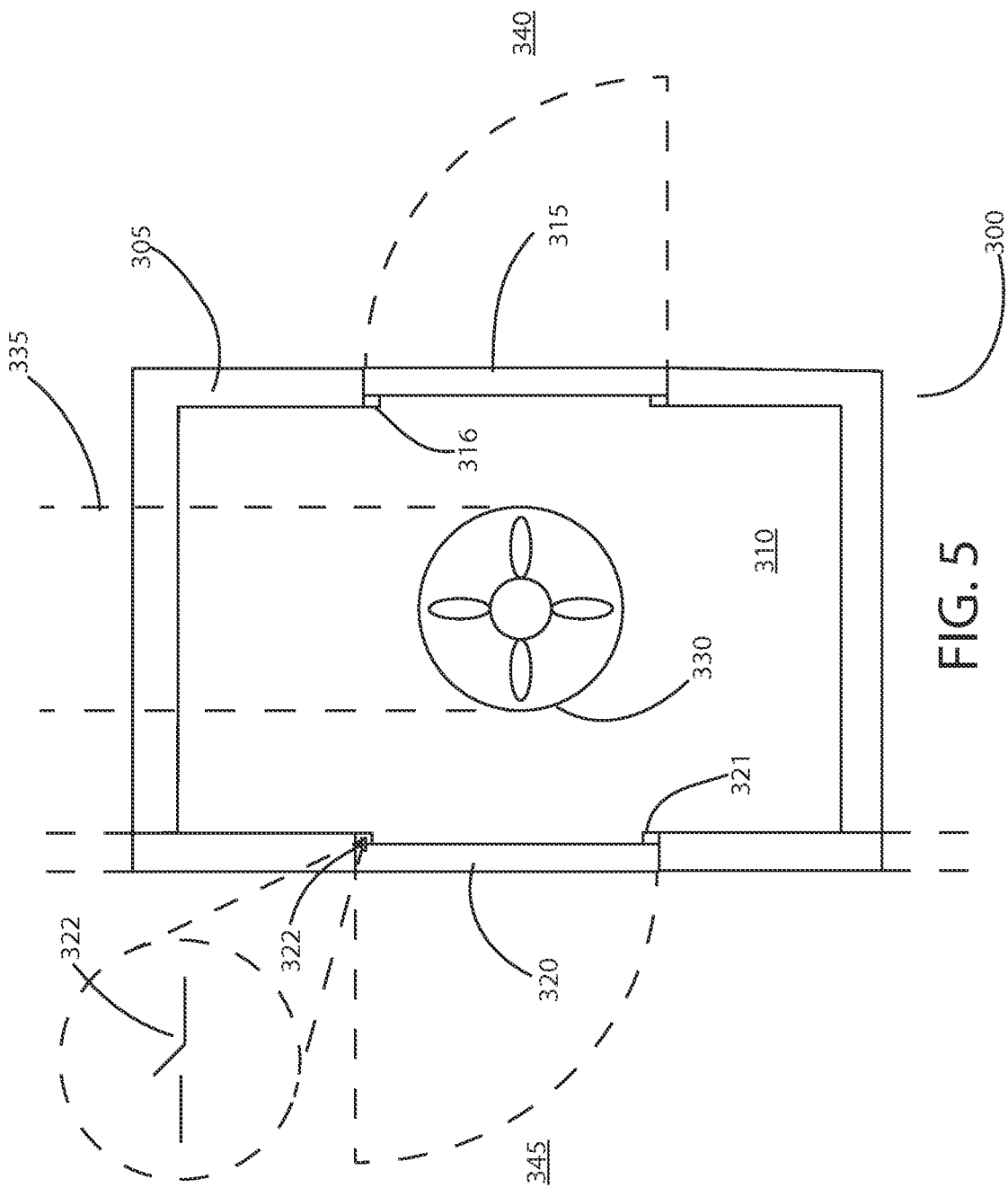

MOBILE THERMAL REGULATION FACILITY

RELATED APPLICATION

This application is a nonprovisional of and claims the benefit of priority of U.S. Provisional Application 62/105,234, the entire contents of which are incorporated herein and made a part hereof by this reference.

FIELD OF THE INVENTION

This invention relates generally to regulation of a person's temperature, and, more particularly, to a mobile facility for heating, cooling and/or comforting a person.

BACKGROUND

Frequently, people attend events or visit attractions in hot and sunny or extremely cold weather. Many experience discomfort from the heat or cold, particularly when limited shade or shelter is available. Some suffer more severe consequences from the heat or cold, including dehydration, hyperthermia and heat stroke in the case of heat, hypothermia and frost bite in the case of cold. When a body absorbs more heat than it can dissipate, the result can be deadly, particularly for the elderly and infirm. Likewise, when the body's core temperature drops below that required for normal metabolism and body functions, severe injury may result.

What is needed is a mobile facility that can efficiently shade, cool or heat and hydrate streams of event attendees while providing comfortable seating and other conveniences. Not only would such a facility comfort attendees, but it would reduce risk of serious injury or death from excessive heating or freezing.

The invention is directed to overcoming one or more of the problems and solving one or more of the needs as set forth above.

SUMMARY OF THE INVENTION

To solve one or more of the problems set forth above, in an exemplary implementation of the invention, a mobile thermal regulation facility is a trailer mounted container suitable for temporary occupation by a plurality of individuals. The facility includes a plurality of walls a roof and a floor that define an interior space in which people may walk, stand and sit. The facility includes at least one door, preferably two or more doors for ingress and egress. Steps and/or ramps facilitate entering and exiting through the doors. An air conditioning unit, heater, heat pump, or refrigeration unit, or combinations of the foregoing, supply cooling and/or heating to the interior compartment of the facility. A dehumidifier may be provided to dehumidify the air. Various filters, ionizers and fragrance dispensers may be provided to filter, ionize or add a scent to the air. One or more fans and ductwork (e.g., ducts, vents, valves and other HVAC air distributions components) distribute cooled or heated air throughout the interior compartment. Windows admit natural light. Seating is provided. Thermal curtains may be draped at each door opening. Refreshment means (e.g., a water dispenser) may be provided. Electric and data utilities in the form of one or more outlets, USB charging stations, an internet access points (e.g., WiFi) may also be provided. Other accoutrements may include display screens for displaying television programming or video captured events.

In one embodiment, the facility includes an entrance and egress, each having a pair of spaced apart doors, an enclosed space between the doors, one door (the outside door) leading to outside (i.e., the ambient environment outside the facility) and the other door (the inside door) leading to the interior space of the facility. The door leading to the interior space swings inwardly into the facility to open, and the door leading to outside swings outwardly towards outside to open. An exhaust fan continuously or periodically exhausts air in the enclosed space to outside, to maintain a negative pressure in the enclosed space relative to the interior space of the facility and outside. The negative pressure keeps both doors in a closed sealed state until forcibly opened by a user. The doors are spaced apart sufficiently so that only one door may be opened at a time. Optionally, as and when the inside door is opened, the exhaust fan ceases operation, to minimize the draw of conditioned (heated or cooled) air from the interior space.

BRIEF DESCRIPTION OF THE DRAWINGS

The foregoing and other aspects, objects, features and advantages of the invention will become better understood with reference to the following description, appended claims, and accompanying drawings, where:

FIG. 5 provides a schematic of an optional arrangement of entrance and egress doors to reduce loss of conditioned air upon users entering and leaving a thermal regulation facility according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
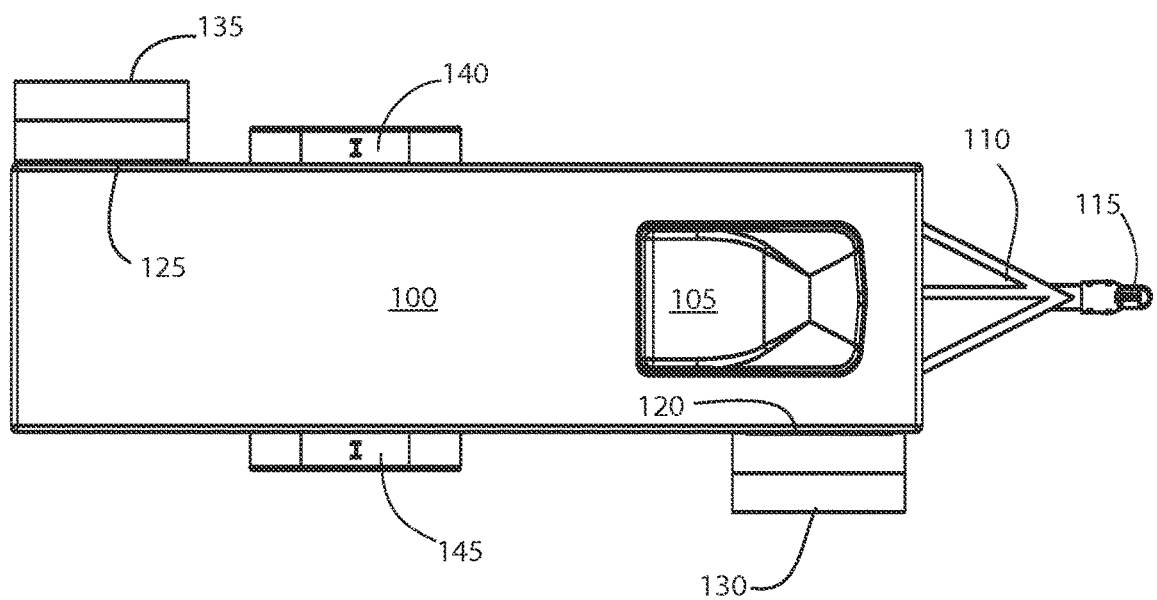
FIG. 1 provides a plan view that conceptually illustrates an exemplary thermal regulation facility according to principles of the invention.

With reference to FIG. 1, a plan view conceptually illustrates an exemplary thermal regulation facility 100 according to principles of the invention. The facility 100 is a trailer mounted container suitable for temporary occupation by a plurality of individuals. The facility 100 includes a plurality of walls a roof and a floor that define an interior space in which people may walk, stand and sit.

The facility 100 includes at least one, preferably two doors 120, 125, each defining an entrance way and exit way, for ingress and egress. Steps 130, 135 and/or ramps facilitate entering and exiting through the doors 120, 125. In a preferred embodiment, the doors 120, 125 open outwardly and are located at opposite ends of the facility 100. However, the invention is not limited to a particular door configuration. In an embodiment with two doors 120, 125, each defining an entrance way and exit way, positioned at opposite ends of the facility, users may enter at one end and exit at the opposite end.

A trailer coupler 115 mounted to an A-frame 110 secures the trailer to the towing vehicle. The trailer includes wheels 140, 145 with axles. Depending upon the size of the trailer, more than one axle may be provided. In an alternative embodiment, the facility 100 may be an integral part of a vehicle, rather than a trailer that connects to a vehicle. In yet another alternative embodiment, the facility may comprise an equipped container (e.g., pod) that can be transported using a trailer or flatbed.

An air conditioning unit 105, heater, heat pump or refrigeration unit, or combinations of the foregoing, supply cooling and/or heating to the interior compartment of the facility 100. Such units are broadly referred to herein as thermal regulation or thermal conditioning units. One or more fans and ducts distribute cooled or heated air throughout the interior compartment. The temperature in the interior compartment may be regulated using a thermostat 226. A dehumidifier may be provided to dehumidify the air. Various filters, ionizers and fragrance dispensers may be provided to filter, ionize or add a scent to the air. One or more fans and ductwork 211 (e.g., ducts, vents, valves and other HVAC air distributions components) distribute cooled or heated air throughout the interior compartment.

Figure 2:
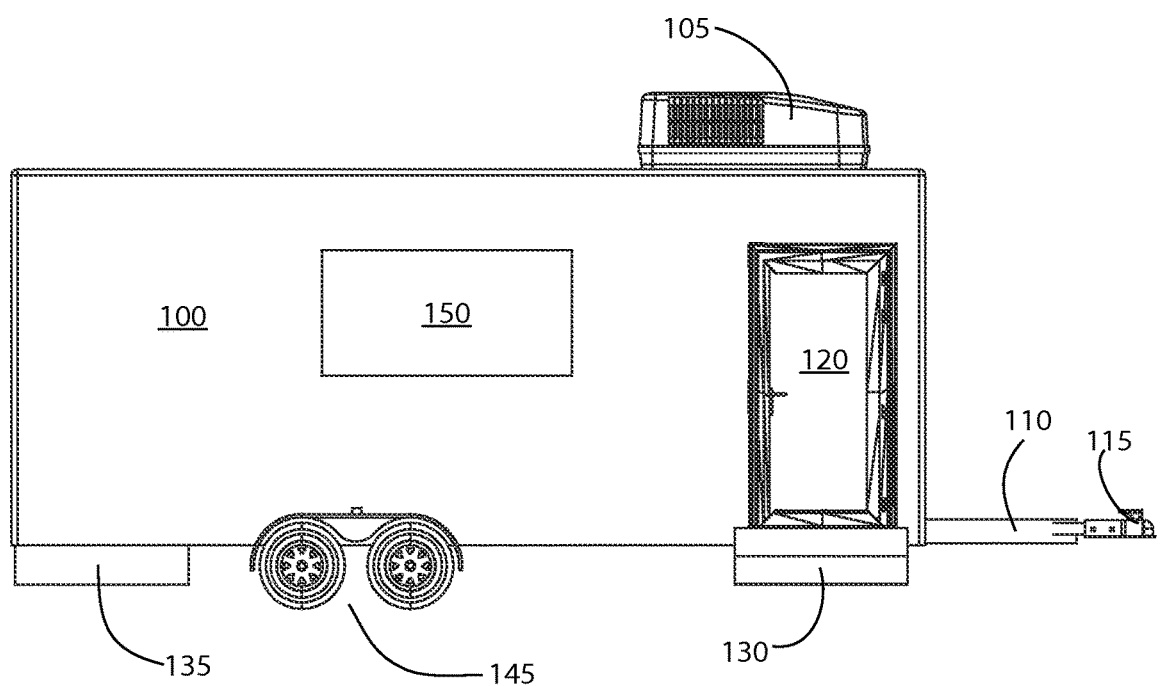
FIG. 2 provides a side view that conceptually illustrates an exemplary thermal regulation facility according to principles of the invention.
Figure 3:
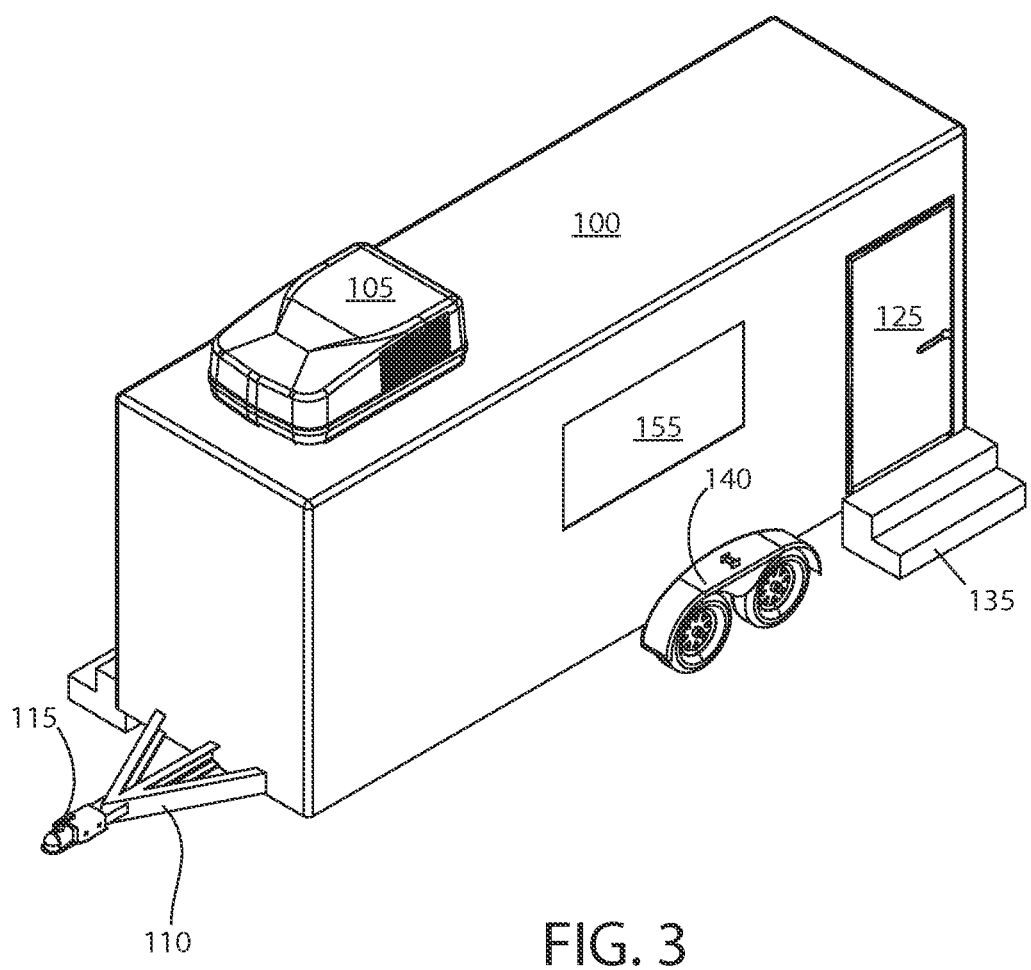
FIG. 3 provides a perspective view that conceptually illustrates an exemplary thermal regulation facility according to principles of the invention.

In FIGS. 2 and 3, windows 150, 155 are shown. The windows 150, 155 admit natural light. The windows may be tinted or shaded to control the amount of light and heat admitted into the interior. In addition to windows for lighting, skylights and electric lighting, both interior and exterior lighting, may be provided.

Figure 4:
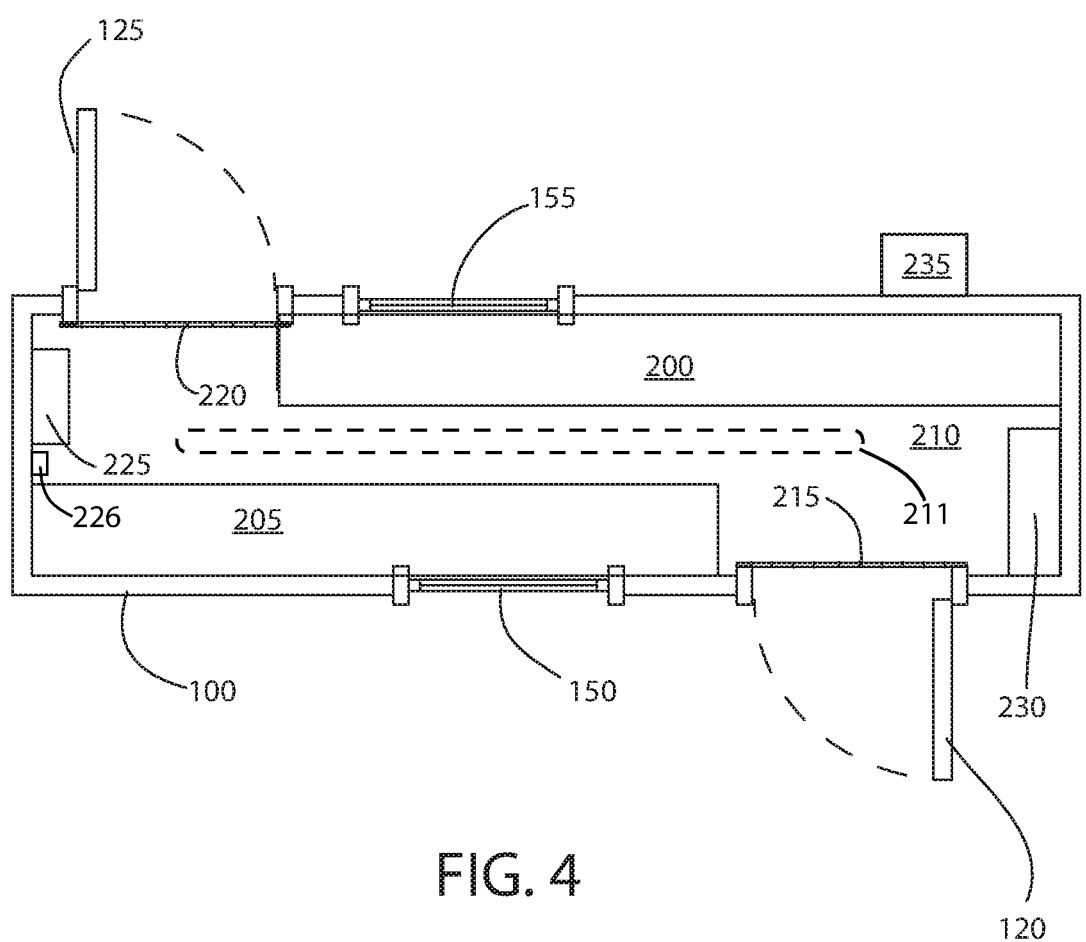
FIG. 4 provides a floor plan schematic for an exemplary thermal regulation facility according to principles of the invention.

Referring to the exemplary floor plan of the interior space in FIG. 4, an aisle 210 extends between opposed seats 200, 205 (e.g., bench seats on opposite sides of the aisle) from one door 120 (e.g., an entrance) to the other door 125 (e.g., an exit). Other seating and aisle arrangements are feasible within the scope and spirit of the invention.

To better insulate the interior space, thermal curtains 215, 220 may be draped at each door opening. The thermal curtain may comprise a plurality of flexible abutting or overlapping strips that may be pushed aside by entering or exiting patrons, but return to the abutting or overlapping arrangement to reduce flow into and out of the interior space when a door 120, 125 is opened.

To accommodate patrons, refreshment means 230 may be provided. For example, a water fountain 235, water cooler, coffee and/or hot chocolate dispenser, and/or one or more vending machines may be provided.

Additionally, electric and data utilities 225 in the form of one or more outlets, USB charging stations, an internet access points (e.g., WiFi) may be provided to accommodate patrons. Using the utilities, patrons may access the internet via WiFi and recharge electrical devices.

Other accoutrements provided in the interior space may include display screens for displaying television programming or video captured events, such as the event for which the patron is attending. Music may also be played in the interior space.

With reference now to FIG. 5, the facility may optionally include an entrance and egress 300, each having a pair of spaced apart doors 315, 320, an enclosed space 310 between the doors, one door (the outside door) 315 leading to outside (i.e., the ambient environment outside the facility) and the other door (the inside door) 320 leading to the interior space of the facility. Walls 305, with a floor and ceiling, or a similar structure substantially enclose the space 310. The door 320 leading to the interior space swings inwardly into the facility to open, and the door 315 leading to outside swings outwardly towards outside to open. An exhaust fan 330 continuously or periodically exhausts air in the enclosed space through a duct 335 to outside 340, to maintain a negative pressure in the enclosed space 310 relative to the interior space 345 of the facility and outside 340. The negative pressure keeps both doors in a closed sealed state, substantially flush against weatherstripping 316, 321 or similar insulating seals until forcibly opened by a user. The doors 315, 320 are spaced apart sufficiently so that only one door may be opened at a time. Optionally, as and when the inside door 320 is opened a switch 322 opens which causes the exhaust fan 330 to cease operation. The switch may be a plunger switch that remains closed when the door is closed and opens when the door is opened. When opened, the switch 322 directly or indirectly (e.g., via actuating or deactivating a solenoid) breaks the circuit supply electric power to the exhaust fan 330 or provides a sensible open door signal to a controller that regulates operation of the fan. Ceasing operating of the fan 330 minimizes the draw of conditioned (heated or cooled) air from the interior space into the space 310 between the doors 315, 320, when the interior door 320 is opened. As soon as the interior door closes, the exhaust fan resumes operation, maintaining a good seal between the interior space 345 of the facility and the ambient environment outside 340.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A thermally regulated mobile facility comprising:
a container defining an interior space sized for temporary occupation by a plurality of individuals, seating in the interior space for the plurality of individuals, an entrance way, and an exit way, a passageway in the interior space from the entrance way to the exit way, said passageway being adjacent to the seating;
a plurality of wheels supporting the container, said wheels allowing transportation of the container;
a thermal regulation unit attached to the container, a thermostat in the interior space of the container and operably coupled to the thermal regulation unit, and ductwork fluidly coupling the thermal regulation unit to the interior space of the container, said ductwork being attached to the container and to the thermal regulation unit, the thermal regulation unit providing thermally conditioned air to the interior space, said thermally conditioned air being air from the group consisting of cooled air and heated air;

the entrance way including a pair of spaced apart entrance way doors, an enclosed space between the pair of spaced apart entrance way doors, one of the pair of entrance way doors being an inside door leading to the interior space of the container, and the other of the pair of entrance way doors being an outside door leading to the exterior ambient environment;

an exhaust fan in fluid communication with the enclosed space between the pair of spaced apart entrance way doors, said exhaust fan exhausting air from the enclosed space to the exterior ambient environment, and maintaining a reduced air pressure in the enclosed space between the pair of spaced apart entrance way doors, the reduced air pressure in the enclosed space maintaining the pair of spaced apart entrance way doors in a closed condition until forcibly opened;

a seal for each of the pair of spaced apart entrance way doors, the inside door opening by swinging into the interior space of the container, the outside door opening by swinging out to the exterior ambient environment; and a switch operably coupled to the inside door, said switch electrically coupled to the exhaust fan and ceasing operation of the exhaust fan when the inside door is open.

2. The thermally regulated mobile facility according to claim 1, the thermally conditioned air being filtered.

3. The thermally regulated mobile facility according to claim 1, the thermally conditioned air being dehumidified.

4. The thermally regulated mobile facility according to claim 1, the thermally conditioned air being scented.

5. The thermally regulated mobile facility according to claim 1, the thermally conditioned air being ionized.

6. The thermally regulated mobile facility according to claim 1, the thermal regulation unit being an air conditioner.

7. The thermally regulated mobile facility according to claim 1, the thermal regulation unit being a refrigeration unit.

8. The thermally regulated mobile facility according to claim 1, the thermal regulation unit being a heating unit.

9. The thermally regulated mobile facility according to claim 1, the thermal regulation unit being a heat pump.

10. The thermally regulated mobile facility according to claim 1, the container including at least one window to admit natural light.

11. The thermally regulated mobile facility according to claim 1, the entrance way including an entrance door, an entrance door opening exposed when the entrance door is in an open state, and a thermal curtain draped over the entrance door opening.

12. The thermally regulated mobile facility according to claim 1, the exit way including an exit door, an exit door opening exposed when the exit door is in an open state, and a thermal curtain draped over the exit door opening.

13. A thermally regulated mobile facility comprising:

a container defining an interior space sized for temporary occupation by a plurality of individuals, seating in the interior space for the plurality of individuals, an entrance way, and exit way, a passageway in the interior space from the entrance way to the exit way, said passageway being adjacent to the seating;

a plurality of wheels supporting the container, said wheels allowing transportation of the container;

a thermal regulation unit attached to the container, a thermostat in the interior space of the container and operably coupled to the thermal regulation unit, and ductwork fluidly coupling the thermal regulation unit to the interior space of the container, said ductwork being attached to the container and to the thermal regulation unit, the thermal regulation unit providing thermally conditioned air to the interior space, said thermally conditioned air being air from the group consisting of cooled air and heated air;

the entrance way including a pair of spaced apart entrance way doors, an enclosed space between the pair of spaced apart entrance way doors, one of the pair of entrance way doors being an inside door leading to the interior space of the container, and the other of the pair of entrance way doors being an outside door leading to the exterior ambient environment;

the exit way including a pair of spaced apart exit way doors, an enclosed space between the pair of spaced apart exit way doors, one of the pair of exit way doors being a second inside door leading to the interior space of the container, and the other of the pair of exit way doors being a second outside door leading to the exterior ambient environment;

a first exhaust fan in fluid communication with the enclosed space between the pair of spaced apart exit way doors, said first exhaust fan exhausting air from the enclosed space to the exterior ambient environment, and maintaining a reduced air pressure in the enclosed space between the pair of spaced apart exit way doors, the reduced air pressure in the enclosed space maintaining the pair of spaced apart exit way doors in a closed condition until forcibly opened;

a seal for each of the pair of spaced apart exit way doors;

the second inside door opening by swinging into the interior space of the container;

the second outside door opening by swinging out to the exterior ambient environment; and a switch operably coupled to the second inside door, said switch electrically coupled to the first exhaust fan and ceasing operation of the first exhaust fan when the second inside door is open.

* * * * *